UNITED STATES PATENT OFFICE.

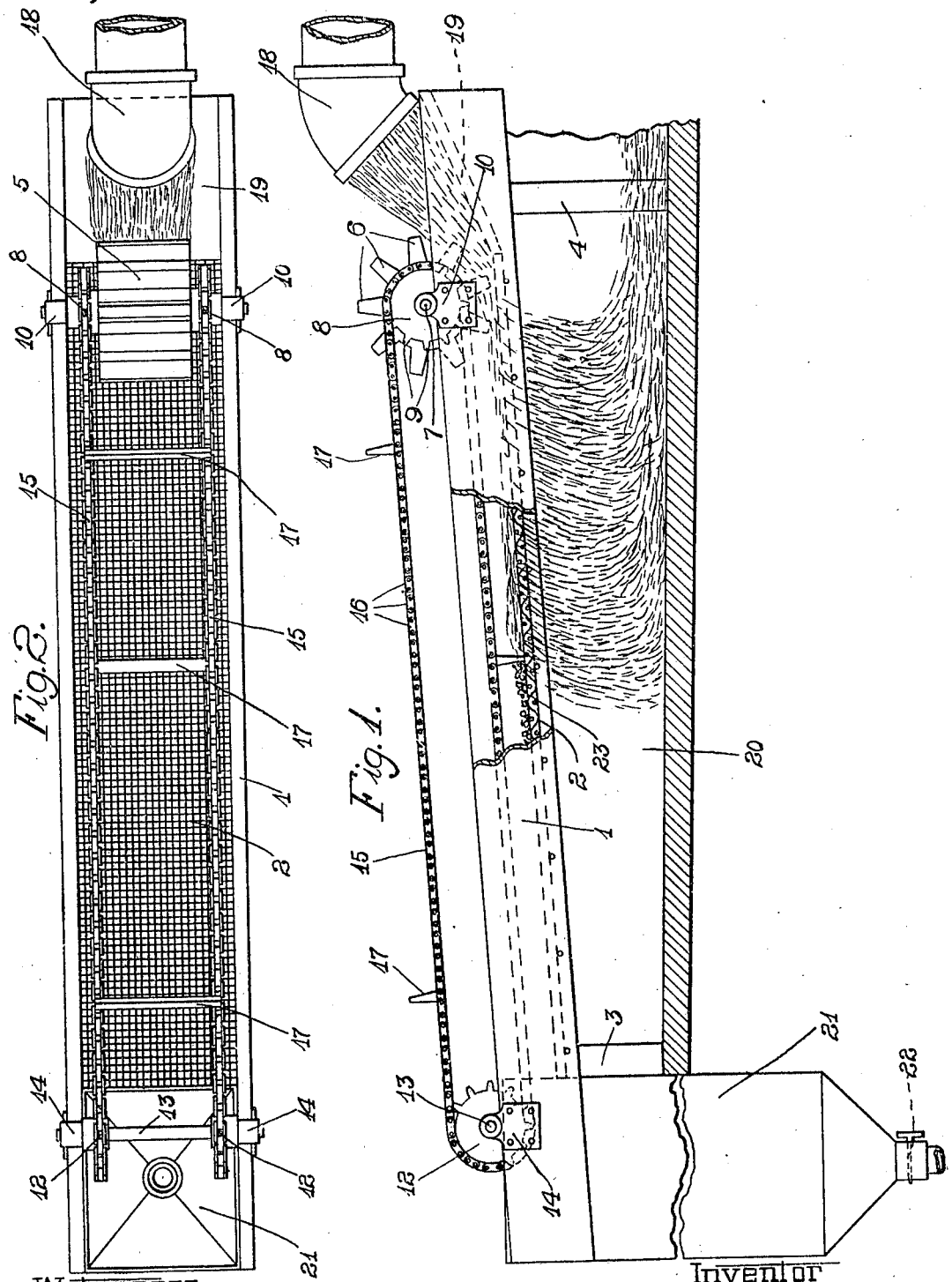

CHARLES P. BOSSERT, OF MILWAUKEE, WISCONSIN.

SEPARATING DEVICE.

955,843.   Specification of Letters Patent.   Patented Apr. 26, 1910.

Application filed May 8, 1909. Serial No. 494,843.

*To all whom it may concern:*

Be it known that I, CHARLES P. BOSSERT, a citizen of the United States, residing at Milwaukee, in the county of Milwaukee and State of Wisconsin, have invented a certain new and useful Improvement in Separating Devices, of which the following is a full, clear, concise, and exact description, reference being had to the accompanying drawings, forming a part of this specification.

My invention relates to a separating device, with particular reference to automatic apparatus adapted to remove fish, sticks, sediment, and other similar refuse from water in a pumping station.

In many cases, it is desirable to remove foreign substances from large quantities of water, circulating through a pumping station. The usual method of accomplishing this result is by means of screens, but the objection to such screens is that they soon become covered with the foreign substances and materials which have been removed from the water so that the water no longer flows through the screen with the desired rapidity. It then becomes necessary to remove the screens and clean them, meanwhile replacing them with other similar screens.

According to my improved method, an automatic apparatus is provided by which the foreign materials are moved from the water by means of the screen, and this foreign material is then automatically removed from the screen.

The exact method of operation of my apparatus will become clear by reference to the drawings, in which—

Figure 1 is a side elevation and partly sectional view of apparatus used in my system, and Fig. 2 is a top plan view of the same apparatus.

A trough 1 is provided having an open bottom. In this open bottom is fastened a wire screen 2 having a mesh of suitable size. The trough 1 rests on supports 3 and 4, and is inclined slightly from a horizontal plane. Toward the upper end of the trough 1 is placed a water wheel 5 provided with suitable blades 6, and rigidly mounted on a shaft 7. Rigidly connected to the same shaft 7 are the sprocket wheels 8, provided with teeth 9. The shaft 7 operates in bearings 10 which are attached to the sides of the trough 1. Toward the lower end of the trough are sprocket wheels 12 similarly mounted on the shaft 13, which operates within the bearings 14, which are in turn attached to the sides of the trough. Endless chains 15 are mounted on the sprocket wheels 8 and 12. These chains are composed of links 16. At intervals on the chains 15 are mounted wipers 17 of rubber or some similar material, these wipers being of sufficient length so that their ends will come in contact with the screen 2, when the chains 15 carry the said wipers into the lower plane of the chains.

At the upper end of the trough 1 is the delivery pipe 18 from which water is pumped. Extending from the upper edge of the upper end of the trough 1 is a baffle-board 19, extending downwardly to the upper end of the screen 2. Below the trough 1 is provided a second trough 20 which slopes slightly. At or near the lower end of the trough 1 and under the sprocket wheel 12 is provided a hopper 21, in the lower end of which is a valve 22.

The operation of my system can now be readily understood. As water is pumped through the delivery pipe 18, it first strikes the baffle-board 19 and then passes under water wheel 5 coming in contact with the blades 6. The water-wheel is thereby turned together with the sprocket wheels 8. The chains 15 mounted on the sprockets 8 and 12 are thereby caused to move, and the wipers 17 are passed along the surface of the screen 2 carrying before them sticks, fish and other refuse as represented at 23. This refuse is carried along the screen by the wiper 17 until it falls into a hopper 21 where it collects and from which it may be removed from time to time by opening the valve 22. In the meantime, the water which passes under the water wheel 5 passes through the screen 2, as shown in Fig. 1, and falls into the trough or sluice-way 20, by which it is carried away as desired.

It is evident that in place of the trough 20 my apparatus could be used in connection with a water tank or any similar apparatus for either collecting or carrying away the water.

Instead of sloping in a direction opposite to that of the trough 1, it is clear that equally successful results could be obtained by having the lower trough 20 slope in the same direction as the trough 1, the water thereby being delivered in the same direction as that in which it entered the apparatus.

Many other minor changes could be made in my device without departing from the spirit of my invention.

What I claim as new and desire to secure by United States Letters Patent is:

1. In combination with a source of flowing liquid, a wheel actuated by the flow of said liquid, a screen for straining said liquid, means for directing said liquid onto said screen, rotary supporting means at each end of said screen, an endless belt mounted upon said rotary supporting means substantially parallel to said screen, means for mechanically connecting said wheel and said rotary supports whereby the latter may be driven, and a wiper attached to said belt, said wiper being of such size that it may pass over such screen and remove extraneous material therefrom.

2. In combination with a source of flowing liquid, a wheel actuated by the flow of said liquid, a screen for straining said liquid, means for directing said liquid onto said screen, rotary supporting means at each end of said screen, an endless belt mounted upon said rotary supporting means substantially parallel to said screen, means for mechanically connecting said wheel and said rotary supports whereby the latter may be driven, a wiper attached to said belt, said wiper being of such size that it may pass over such screen and remove extraneous material therefrom, and means for collecting the liquid passing through said screen.

3. In combination with a source of flowing water, a trough for containing said water, a screen in the bottom of said trough, a wheel actuated by said water, a belt substantially parallel to said screen, rotary supports for said belt, one of said supports rigidly connected with said wheel, a wiper attached to said belt, said wiper adapted to remove extraneous material from said screen, means for collecting the water passing through said screen, and a receptacle adapted to receive the material removed from said screen.

4. In a water pumping system, the combination with a delivery pipe, of a trough, a wheel supported in said trough, a baffle-board in said trough, said baffle board adapted to direct water from said delivery pipe against said wheel, thereby rotating said wheel, a strainer in said trough, means actuated by said wheel for removing extraneous material from said strainer, and a receptacle for receiving the water passing through said screen.

5. In a water pumping system, the combination with a delivery pipe, of a trough, a wheel supported in said trough, a baffle-board in said trough, said baffle board adapted to direct water from said delivery pipe against said wheel, thereby rotating said wheel, a strainer in said trough, means actuated by said wheel for removing extraneous material from said strainer, a receptacle for receiving the extraneous material so removed, and a receptacle for receiving the water passing through said screen.

6. In a water pumping system, the combination with a delivery pipe, of a trough, a wheel supported in said trough, a baffle-board in said trough, said baffle-board adapted to direct water from said delivery pipe against said wheel, thereby rotating said wheel, a strainer in said trough, means actuated by said wheel for removing extraneous material from said strainer, and a second trough below said first trough for receiving the water passing through said screen, said lower trough adapted to carry away the water so received.

7. In a water pumping system, the combination with a delivery pipe, of a trough, wheel supported in said trough, a baffle-board in said trough, said baffle-board adapted to direct water from said delivery pipe against said wheel, thereby rotating said wheel, a strainer in said trough, means actuated by said wheel for removing extraneous material from said strainer, a receptacle for receiving the material removed from said screen, and a second trough below said first trough for receiving the water passing through said screen and for carrying away the water so received.

8. In combination with a source of flowing liquid, a trough having a reticulated bottom, an endless flexible element parallel to said bottom, a wiper on said flexible element, rotatable supports for said flexible element, and mechanism operated by the flow of the liquid for actuating said rotatable supports and moving said flexible element parallel to said bottom to cause said wiper to remove extraneous material therefrom.

In witness whereof, I hereunto subscribe my name, this 30th day of April, A. D. 1909.

CHARLES P. BOSSERT.

Witnesses:
M. SCHIEBERT,
F. SCHOEPPEL.